Jan. 5, 1954

F. NIESEMANN 2,664,674

FLUID REGULATOR VALVE

Filed April 27, 1948

INVENTOR.
Fritz Niesemann
BY
*Strauch & Hoffman*
Attorneys

Jan. 5, 1954    F. NIESEMANN    2,664,674
FLUID REGULATOR VALVE
Filed April 27, 1948    2 Sheets-Sheet 2

Inventor
Fritz Niesemann

By Strauch + Hoffman
Attorneys

Patented Jan. 5, 1954

2,664,674

UNITED STATES PATENT OFFICE 2,664,674

FLUID REGULATOR VALVE

Fritz Niesemann, Pittsburgh, Pa., assignor to Rockwell Manufacturing Company, Pittsburgh, Pa., a corporation of Pennsylvania Application April 27, 1948, Serial No. 23,482

5 Claims. (Cl. 50—23)

This invention relates to fluid pressure regulators, and in particular to improvements therein which tend to prevent failure of the valve and permit the inspection and repair of the working elements thereof without removing the entire valve structure from the fluid line within which it is installed.

Fluid pressure valves of the type to which this invention relates are normally installed in a high pressure gas line to reduce the pressure from the supply pressure to a lower value which is maintained substantially constant irrespective to fluctuations in supply pressure due to varying demands upon the supply line or due to variations in the volume of gas required to be delivered by the regulator. Such valves usually consist of fixed members forming a part of the gas line, not normally subject to wear or deterioration, and cooperating movable regulating elements which are subject to wear or deterioration and which should be inspected at intervals and replaced or adjusted when necessary.

It is a primary object of my invention to provide a novel regulating valve structure which may be readily disassembled for inspection and replacement with a minimum of labor.

It is another object of my invention to provide a novel regulating valve structure wherein all of the moving elements can be removed readily, and replaced and adjusted without disturbing the major stationary elements or the line within which they are installed.

Another major object of the invention is the provision of a novel and improved regulating valve structure which is so constructed and arranged as to require a minimum of inspection or service, and in which replacement elements can be substituted without difficulty, means being provided to prevent failure of certain elements which are normally subject to failure due to unusual operating conditions.

Other objects will become apparent as the description proceeds in connection with the accompanying drawings, wherein.

Figure 3:
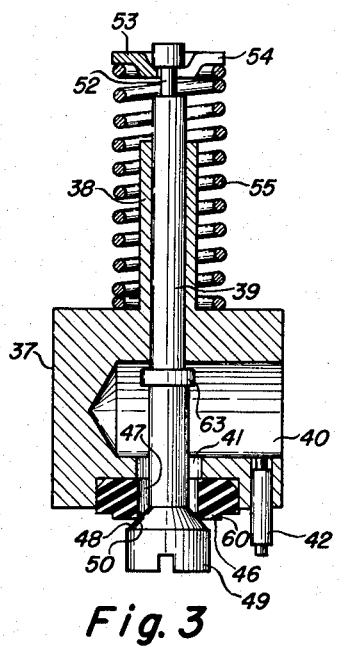
Figure 3 is a vertical section through a removable regulating valve assembly shown in Figure 1, in enlarged detail.

Referring to the drawings, 11 designates the stationary body of the valve having an inlet 12 and an outlet 13 which are threaded to receive mating threaded ends of the pipe within which the regulator is installed. The inlet 12 is connected to the outlet 13 via an inclined bore 14, a central bore 15 having an enlarged coaxial chamber 16, and a bore 17 coaxial with the outlet 13. The bottom of the central bore 15 is closed by a threaded plug 20. A regulating valve assembly shown in enlarged detail in Figure 3 is controlled to regulate the rate of flow and the pressure of the gas delivered to the outlet 13. The body 11 is threaded to receive a cover 18, the body and cover having opposed shoulders between which is clamped a flexible diaphragm 19 when the cover and body are secured together.

Figure 2:
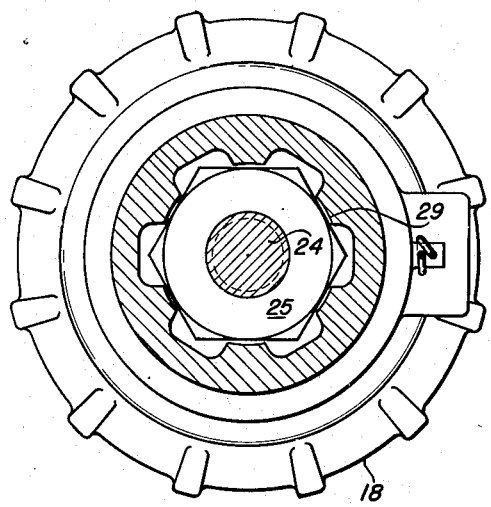
Figure 2 is a horizontal section along the line 2—2 of Figure 1.

The center of the diaphragm is clamped in an airtight manner between a threaded washer 22 and the enlarged head of a bolt 23. At its top the cover 18 journals an adjusting screw 24 which has a nut 25 thereon to provide an adjustable abutment for one end of a coiled compression spring 26, the other end of which bears against the washer 22. The screw 24 is urged upwardly by the spring 26, and a shoulder 27 on the screw prevents upward movement of the screw, which protrudes through the cover 18, and has flattened faces as at 28 which may be engaged by a suitable wrench for rotating the screw to adjust the compression in spring 26. As best shown in Figure 2, the cover 18 has longitudinal internal flutes 29 which receive the corners of the nut 25 to keep it from turning but permit it to move axially along the screw 24. The top of the cover is closed by a screw cap member 32 which also covers the top of the screw and makes it inaccessible except by breaking a lead seal 33. The space within the cover 18 and above the diaphragm 19 is vented to the atmosphere at 34, a suitable water and dirt excluding fitting being threaded to the cover at 34 as will be understood. One such fitting is shown in United States Patent 2,302,284.

The assembly received in the chamber 16, and shown enlarged in Figure 3, comprises a cylindrical member 37 having a coaxial extension 38 providing a guide for a valve stem 39. Midpoint of its height the member has a blind transverse bore 40, which when the assembly is placed within the body 11, is connected to the central bore 15 by a passageway 41. When the assembly is placed within the body the blind bore 40 is aligned axially with the bore 17 and the outlet 13 in the body, such alignment being assured by a locating pin 42 that is carried by the member 37 and is seated in a locating hole 43 in the valve body 11.

Figure 5:
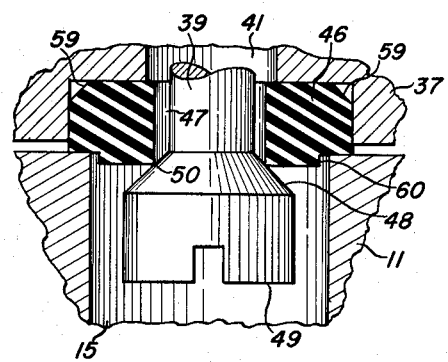
Figure 5 is an enlarged vertical sectional view of the valve and valve seat of Figures 1 and 3.

The bottom of the member 37 has an annular recess coaxial with the passageway 41, within which recess is received a resilient annular rubber valve seat 46, shown in enlarged sectional detail in Figure 5. The valve stem 39 extends through the passageway 41 and through the aligned central bore 47 in the valve seat 46, terminating in a conical flaring portion 48 which forms the valve, and an enlarged head 49. When the valve 48 engages the sharp right angled corner 50 of the rubber valve seat 46 it stops the flow of gas through the regulating valve body. Flow through the body is regulated by moving the valve 48 with respect to the corner 50, as will be understood.

Adjacent its upper end the valve stem 39 has a reduced necked portion 52 over which is slipped a washer 53 having a radial slot 54 which can pass over the neck 52. A compression spring 55 surrounds the extension 38, and is confined between the washer 53 and the top of the cylindrical member 37 to resiliently urge the valve stem 39 upwardly so that its valve engages the corner 50 of the valve seat.

Figure 1:
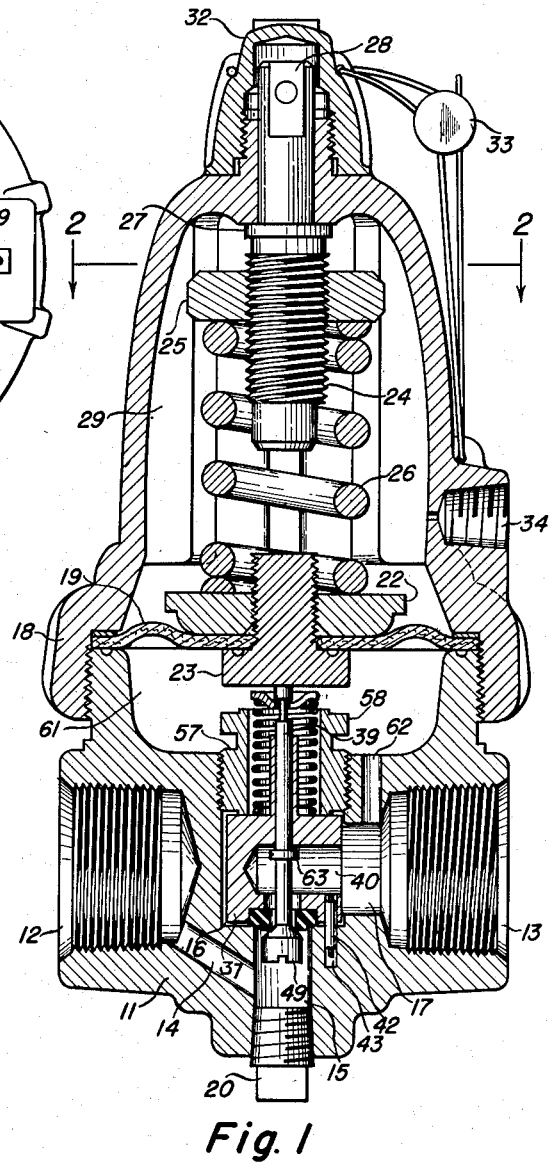
Figure 1 is a vertical sectional view through the center of a fluid pressure regulator illustrating the principles of my invention.
Figure 4:
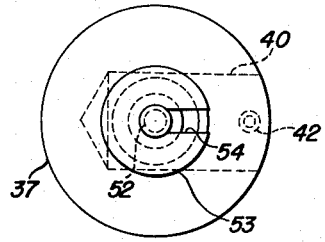
Figure 4 is a top plan view of the assembly of Figure 3.

When the assembly of Figure 3 has been dropped into the chamber 16 and aligned with the bore 17 by means of the locating pin 42 it is secured in place by an externally threaded clamping sleeve 57 having an appropriate head 58 which may be four- or six-sided for engagement by an appropriate wrench. Referring particularly to Figures 1 and 5 it will be seen that the annular rubber valve seat 46 is thicker than the recess within which it is confined, and that the valve seat itself provides a seal between the body 11 and the member 37 to prevent the leakage of gas therebetween. Also referring to Figure 5, the top outer corner of the rubber valve seat 46 is peripherally chamfered at 59. This chamfer permits positive seating of the valve seat in spite of dirt or the like which may occur in the corner of the annular recess which receives it. The chamfer also performs another important function. A body of rubber which is wholly confined by a rigid enclosure is practically incompressible because there is no place for the rubber to flow or expand into. Since the rubber valve seat 46 is not entirely confined, when the assembly of Figure 3 is clamped into place by the sleeve 57 the rubber would tend to flow or deform so as to constrict its central bore 47, thus affecting the flow therethrough. However, the chamfer 59 permits the rubber to flow into the space provided thereby, rather than to flow so as to constrict the central bore, since the chamfer 59 lies within the peripheral zone of the valve seat 46 which is compressed against the body 11.

It will also be noted in Figure 5 that the rubber seat 46 is slightly thicker adjacent its bore 47 than it is adjacent its periphery, its bottom surface lying in two planes and having a shoulder 60. This construction also prevents constriction of the bore 47, particularly at the corner 50, when the sleeve 57 is tightened.

The chamfer 59 and the construction forming the shoulder 60 also permit the material of the rubber valve seat 46 to flow radially outwardly rather than toward the bore 47 when the valve 48 is pressed against the corner 50 of the valve seat.

The top of the valve body 11 has a central cup-shaped recess providing a chamber 61 beneath the diaphragm 19. The pressure in chamber 61 is maintained at a value approximating that of the pressure of the gas flowing to the outlet 13 by means of a connecting passageway 62 (Figure 1) between the chamber 61 and the bore 17. As will be understood by those skilled in the art the pressure of the gas below the diaphragm 19 is balanced against the atmospheric pressure and the force exerted by spring 26 to determine the position of the diaphragm 19 and thus the amount of valve opening. When the pressure within chamber 61 is sufficient to lift the diaphragm so as to disengage the bolt 23 from the top end of the valve stem 39, the stem 39 will be raised by the spring 55 until the valve 48 engages the rubber valve seat 46 at the corner 50.

Where the valve stem 39 passes through the bore 40 in the member 37, it is provided with an annular collar or baffle 63 which is considerably larger than the bore of the extension 38 which forms the valve stem guide. The baffle 63 lies close to the bottom of the said bore when the valve is closed, and moves down with the stem 39 as the valve is opened. Its purpose is to deflect dirt or moisture in the flowing gas stream away from the valve stem guide so that it cannot enter the bore thereof and cause the stem 39 to stick in its guide.

Figure 6:
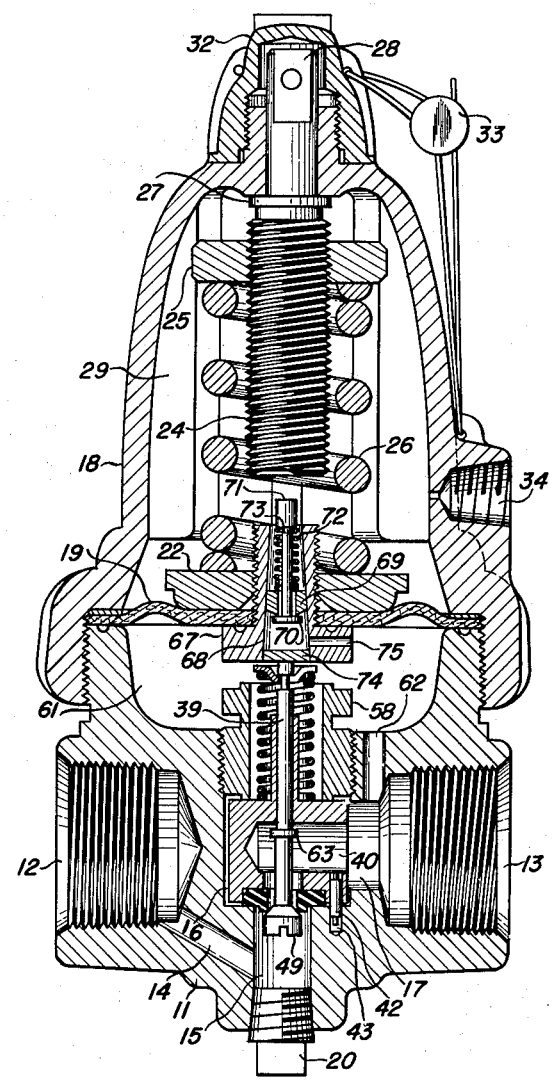
Figure 6 is a vertical sectional view similar to Figure 1 but showing a modification.

Figure 6 shows another embodiment of my invention that is similar in every respect to the previously described embodiment except that it has an additional relief valve permitting the flow of gas from the chamber 61 through the diaphragm into the cover 18 to relieve excess differential pressure therebetween as might occur from surges in line pressure or other causes, such as back pressure from the outlet 13.

As shown in Figure 6, the bolt 67 which clamps the diaphragm 19 to the threaded washer 22, has a tapered axial bore 68 which is smaller at the top than the bottom. A one way relief valve comprising a combined guide and seat 69, a movable element including a stem 73 having a valve 70 on the bottom and an enlarged head 71 on the top, and a compression spring 72, are fixedly mounted within the tapered bore 68. The conical outer wall of the guide and seat 69 is so dimensioned that when it is forced upwardly into the tapered bore 68 it securely wedges the relief valve within the bore and seals the passage therethrough except when the valve 70 is lowered away from its seat. After the relief valve is secured within the bore 68, the bottom of the bore is closed by an insert 74 which must be provided so that the top of the valve stem can be engaged by the head of the bolt 67. Communication between the bore 68 and the chamber 61 is by way of a radial passageway 75 in the head of the bolt. The enlarged head 71 of the check valve stem protrudes above the top of the threaded end of the bolt 67, so that it will engage the bottom end of the adjusting screw 24 if the diaphragm 19 is raised sufficiently by the pressure in chamber 61. The relief valve will thus prevent rupture of the diaphragm due to differential pressure between the chamber 61 and the cover 18 when the diaphragm is at the top of its stroke, because the gas can then flow through the relief valve into the cover 18 and thence out the vent 34.

I have thus provided an improved regulating valve which because of its novel construction, will have a long life and give a maximum of trouble-free performance. It can be easily disassembled for inspection and repair and the regulating elements themselves may be removed and replaced and positive alignment assured. The rubber valve seat also acts as a sealing gasket and is so constructed that its regulating function is not affected by its sealing function.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid flow regulator comprising a body having a passageway therethrough; means forming a transverse peripheral shoulder in said passageway; a member seated upon said shoulder and blocking said passageway, said member having a bore therethrough to connect the blocked portions of said passageway; a flexible element having an aperture therethrough aligned with a portion of said bore, said flexible element extending between said member and said shoulder to provide a fluid seal therebetween; a movable valve cooperative with said flexible element to regulate the flow through said bore and passageway; a first resilient means carried by said member operative to bias said movable valve to close the aperture of said flexible element; a flexible differential pressure responsive device subjected on one side to atmospheric pressure and on the other side to the pressure of the fluid between said valve and the outlet of said passageway, said device being operatively coupled to said valve to control the movements thereof with respect to said flexible element in opposition to the biasing force of said first resilient means; means operative to control the differential pressure required to deflect said differential pressure responsive device, and relief valve means coupled with said differential pressure responsive device to allow the flow of air from the high pressure side to the low pressure side of said differential pressure responsive means when such differential pressure is excessive, a second resilient means normally biasing said relief valve means to its closed position, said relief valve means being constructed and arranged to be opened by a fixed part of said regulator in response to deflection of said differential pressure responsive device to a predetermined limit and in opposition to said second resilient means.

2. A fluid flow regulator comprising a body having an inlet passageway and an outlet passageway intersecting at an angle; means forming a transverse peripheral shoulder in said inlet passageway; an axially slidable removable member seated upon said shoulder and blocking the passage between said passageways, said member having two intersecting bores therethrough to connect said inlet and outlet passageways; locating means between said body and said member to assure alignment between the bores in said member and the passageways in said body; means cooperating with said body and said member to hold said member upon said shoulder; a movable valve operable to cooperate with one of said bores to control the flow therethrough, said valve having a stem extending through said member and said member having a third bore providing a guide therefor; baffle means on said stem and within one of said intersecting bores to prevent the entrance of foreign particles into said third bore; resilient means surrounding said stem urging said valve toward its closed position; and a diaphragm subjected on its opposite sides, respectively, to the pressure at said outlet and atmospheric pressure, adapted to modify the action of said resilient means.

3. A fluid flow regulator comprising a body having an inlet passageway including two coaxial bores of different diameter, there being an annular shoulder at their juncture; an outlet passageway in said body intersecting the larger of said two bores at an angle thereto; an axially slidable removable member in the larger of said bores, seated upon said shoulder and blocking the passage between said passageways at their intersection, said member having two intersecting bores therethrough connecting said inlet and outlet passageways; locating means between said body and said member to assure alignment between the bores in said member and the passageways in said body, an annular resilient element aligned with said bores of said inlet passageway and extending between said removable member and said shoulder to provide a sealing gasket therebetween; a movable valve cooperative with said resilient element to regulate the flow through said removable member to said outlet passageway; means cooperating with said body and said removable member to retain said removable member in the larger of the bores in said inlet passageway and compress said resilient element between said removable member and said shoulder; a diaphragm subjected on its opposite sides, respectively, to the pressure at said outlet and atmospheric pressure adapted to control the movement of said valve; and resilient means urging said valve element toward said diaphragm.

4. A fluid flow regulator comprising a body having a bore therein to form an inlet passageway, there being an annular shoulder in said bore dividing said bore into a first and a second section; an outlet passageway in said body intersecting said second section at an angle thereto; an axially slidable removable member in said second section seated upon said shoulder and blocking the passage between said first section and said outlet passageway, said member having two intersecting bores therethrough connecting said first section and said outlet passageway; locating means between said body and said member to assure alignment between the bores in said member with said first section and said outlet passageway; an annular resilient element between said removable member and said shoulder to provide a sealing gasket therebetween; a movable valve cooperating with said resilient element to regulate the flow through said removable member to said outlet passageway; means cooperating with said body and said removable member to retain said removable member in said second section and compress said resilient element between said removable member and said shoulder; and a flexible differential pressure responsive device subjected on one side to atmospheric pressure and on the other side to pressure in said outlet passageway in the body, said device being coupled to said valve to control the movement of said valve with respect to said resilient element; said removable member, resilient element and valve being associated as an assembly which is removable from said body as a unit.

5. A fluid flow regulator comprising a body having a bore therein to form an inlet passageway, there being an annular shoulder in said bore dividing said bore into a first and a second section; an outlet passageway in said body intersecting said second section at an angle thereto; an axially slidable removable member disposed within said second section, said member having two intersecting bores therethrough connecting said first section and said outlet passageway; locating means between said body and said member to assure alignment between the bores in said member with said first section and said outlet passageway; an apertured flexible element attached to said removable member and located interposed between said removable member and said shoulder to provide a fluid tight seal therebetween; a movable valve cooperating with the aperture of said flexible element to regulate the flow through said aperture and the intersecting bores of said removable member to said outlet passageway; resilient means carried by said removable member operative to bias said movable valve to close the aperture of said flexible element; means cooperating with said body and said removable member to retain said removable member in said second section and compress said resilient element between said removable member and said shoulder to block the passage between said second section and said outlet passageway; and a differential pressure responsive device subjected on one side to atmospheric pressure and on the other side to pressure in said outlet passageway in the body, said device being operatively coupled to said valve to control the movement of said valve with respect to said flexible element in opposition to the biasing force of said resilient means; said removable member, said flexible element, said resilient means and said valve being associated as an assembly which is removable from said body as a unit.

FRITZ NIESEMANN.

References Cited in the file of this patent

UNITED STATES PATENTS

| Number | Name | Date |
|---|---|---|
| 1,041,237 | Budlong | Oct. 15, 1912 |
| 1,582,511 | Coberly | Apr. 27, 1926 |
| 1,588,107 | Harris | June 8, 1926 |
| 1,659,263 | Harris | Feb. 14, 1928 |
| 1,694,234 | Schimmel | Dec. 4, 1928 |
| 2,212,626 | Thomas | Aug. 27, 1940 |
| 2,252,152 | Work | Aug. 12, 1941 |
| 2,343,146 | Jenkins | Feb. 29, 1944 |
| 2,368,206 | Du Charme | Jan. 30, 1945 |
| 2,447,067 | Hamilton | Aug. 17, 1948 |
| 2,520,092 | Fredrickson | Aug. 22, 1950 |